United States Patent [19]

Smith et al.

[11] Patent Number: 4,717,090

[45] Date of Patent: Jan. 5, 1988

[54] DEVICE FOR RESTORING AND REMOVING A TAPE LEADER BLOCK TO AND FROM A TAPE CASSETTE

[75] Inventors: David E. Smith, Lafayette; Dennis R. Olmsted, Longmont, both of Colo.

[73] Assignee: Aspen Peripherals, Longmont, Colo.

[21] Appl. No.: 872,951

[22] Filed: Jun. 11, 1986

[51] Int. Cl.$^4$ .................... G11B 15/66; G11B 15/32
[52] U.S. Cl. .................................. 242/197; 226/92; 242/195; 360/95
[58] Field of Search ............... 242/192, 195–200; 360/93–95, 132; 226/91, 92

[56] References Cited

U.S. PATENT DOCUMENTS

| | | | |
|---|---|---|---|
| 4,027,832 | 6/1977 | Lopata | 242/197 |
| 4,335,858 | 6/1982 | Cranna | 242/195 |
| 4,350,309 | 9/1982 | Richard et al. | 242/68.3 |
| 4,383,660 | 5/1983 | Richard et al. | 242/197 |
| 4,399,936 | 8/1983 | Rueger | 226/92 |
| 4,426,047 | 1/1984 | Richard et al. | 242/197 |
| 4,432,508 | 2/1984 | Inoue et al. | 242/195 |
| 4,445,154 | 4/1984 | Kihara et al. | 360/95 X |
| 4,452,406 | 6/1984 | Richard | 242/195 |
| 4,477,851 | 10/1984 | Dalziel et al. | 360/95 |
| 4,608,614 | 8/1986 | Rinkleib et al. | 242/195 X |

*Primary Examiner*—John Petrakes
*Attorney, Agent, or Firm*—Dorr, Carson, Sloan & Peterson

[57] ABSTRACT

A tape leader block can be restored to and removed from its housing in a tape cassette by a device which comprises a threader arm having a leader block carrier which supports a threader pin. The leader block carrier also is provided with a gear system which engages with a compatible gear system of a rotatable yoke. The yoke terminates in a cam follower which is forced into certain distinct operating positions by powered movements of a camming device. Attainment of these operating positions serves to restore or remove the leader block to and from the tape cassette's leader block housing.

4 Claims, 4 Drawing Figures

DEVICE FOR RESTORING AND REMOVING A TAPE LEADER BLOCK TO AND FROM A TAPE CASSETTE

BACKGROUND OF THE INVENTION (1) Field of the Invention

This invention generally relates to tape threading devices, especially those used in magnetic tape drive systems. More particularly this invention is concerned with devices for restoring and removing tape leader blocks to and from the leader block housings provided for such leader blocks in most tape cassettes.

(2) Description of the Prior Art

Various devices have been developed for automatically threading tapes from supply reels, past transducer heads, and on to take-up reels. One widely used tape threading device is disclosed in U.S. Pat. No. 4,399,936 ("the -936 patent"). In the case of magnetic tapes, the tape is usually dispensed from a tape cassette by a pulling action upon a leader block. This pulls the leader block out of the cassette's leader block housing. This in turn pulls the tape out of the cassette. The leader block is restored back into the cassette's leader block housing by pushing upon the leader block, preferably while the tape is being rewound. Most leader blocks are housed in a diagonal orientation with respect to one corner of an otherwise rectangular-shaped tape cassette. U.S. Pat. No. 4,383,660 ("the -660 patent") well represents this kind of tape cassette system. The leader block is held in the leader block housing by means of a cantilevered arm which forms a part of the front surface of the tape cassette. The cantilevered arm usually has a rounded edge which engages a rounded lip boss on the underside of the front of the leader block. This engagement is in the nature of a compression fit between the rounded edge of the cantilevered arm and the rounded lip boss of the leader block. In effect, the cantilevered arm acts as a projecting leaf spring which positions the leader block within the cassette housing. As is well illustrated in FIGS. 3a, 3b and 3c of the -660 patent, a pulling force upon the leader block will disengage it from the leader block housing. In effect, the rounded edge of the cantilevered arm will be lifted slightly upward by a lifting force transmitted to the leader block's lip boss. This lifting force is provided by a rearward pull of the threader pin. Assuming sufficient pulling and lifting forces, the rounded lip boss of the leader block will slide past the rounded edge of the cantilevered arm and thereby permit the complete withdrawal of the leader block from the leader block housing. Conversely, a pushing force upon the leader block will cause the rounded lip boss of the leader block to slide inwardly past the rounded edge of the cantilevered arm and thereby restore the leader block to a snug fit within the cassette's leader block housing.

Restoration and removal of the leader block from the cassette's leader block housing also presupposes an initial successful coupling of the threader pin with the threader pin receiver in the leader block. Therefore, an understanding of certain problems encountered in the coupling and uncoupling of threader pins and leader blocks also will provide a further appreciation of the device disclosed in this patent application. We can begin by first noting that the threader pin of our device could have various configurations. For example, it could be presented in the form of a ball suspended from a rod, a cylinder suspended from a rod, etc. In any event, the forward ends of the leader blocks are usually provided with receivers which are presented in the form of openings or slots which are highly compatible with the configurations of the threader pins employed. Most threader pins currently in use have a relatively short enlarged cylindrical member whose diameter is greater than that of a more elongated rod-like top portion of the threader pin which in turn is attached to the underside of the threader arm.

Threader arm devices such as the one disclosed in the -936 patent usually deliver their associated threader pin directly to the leader block under the power and action of the gear motor torque which is delivered to the threader arm. That is to say, the threader arm's gear motor torque is employed both to thread the tape through the tape deck system and to restore and remove the leader block to and from the cassette's leader block housing. The restoration and removal operations cause a great deal of wear upon the gear motor system in their own right. Moreover, the other threading operations that these prior threader arm devices are called upon to perform represent another source of gear motor wear. Eventually, wear from all such sources leads to threader arm motor/gear train failures and/or failures due to certain threader pin/leader block misalignments. They are made more pronounced by the fact that delivery of the threader pin to the leader block represents the final phase of a powered rotation of the threader arm in these prior art devices. This final phase of the threader arm's rotation must, however, be carried out very accurately. Any substantial misalignment between the incoming threader pin and the leader block's receiver slot will cause the threader pin to miss the receiver slot and collide with inappropriate parts of the leader block. Such wear is perhaps the largest single factor in producing collisions due to threader pin/leader block receiver misalignments. Such malfunctions are usually exacerbated by the fact that the threader pin approaches the leader block's receiver slot at rather high rates of speed. Thus, misalignment often produces a violent collision of the threader pin on the edge of the leader block's receiver slot rather than a smooth, assured coupling of these two parts. However, slower threader arm speeds are not a particularly viable solution to the problem. Threader arms need enough torque to restore and remove the leader block to and from their cassette housing; and they need certain speed and momentum attributes in order to pull the tape through the remainder of the rather circumvoluted paths they often must follow between the supply reel and the take-up reel. Consequently, most prior art threader arms are usually designed and powered much more by considerations associated with pulling the tape through a convoluted tape deck path than they are by considerations associated with some eventual collision of the threader pin upon some inappropriate part of the leader block.

SUMMARY OF THE INVENTION

This invention seeks to minimize many of the problems now associated with restoring and removing a leader block to and from its tape cassette housing. Above all it seeks to reduce wear upon the threader arm's motor/gear train system. It also aids in reducing wear in other parts of the tape drive system as well as in avoiding violent collisions between the threader pin and the leader block. A simple, reliable, long lasting means for accurately aiming and guiding a threader pin into a leader block receiver, and then pulling the leader block out of the cassette's leader block housing, is provided by this device. Operated in reverse, it is equally capable of accurately and forcefully restoring the leader block back into the cassette's leader block housing. One very important aspect of our invention is the fact that the removal and restoration of the leader block is carried out by the action of a powered cam rather than by the action of the threader arm's gear motor torque. Most preferably, the cam is manually powered rather than motor powered. For example, manual power could be supplied by the manual act of closing a hinged tape cassette loading door in the tape deck system. This manual action could, for example, be converted into a downward force upon the cam. The mechanical linkages, springs, etc., associated with such manually operated tape cassette loading doors and trays are varied, but well known to this art. The cam could be powered in the upward direction by a spring which forces the cam upward. Such a spring could be upwardly biased against the cam by a downward force initially provided by the manual act of closing the loading door. A less preferred, but still viable means for powering the cam would be through the use of a motor connected to the cam. In either case however, the cam is completely separate and distinct from the operation of the gear motor which drives the threader arm. Leader block restoration and removal operations can be carried out completely independent of threader arm's other torque, speed and momentum requirements. For example, they can be carried out much more slowly just prior to threader pin/leader block contact. Wear upon the threader arm's motor/gear train system due to threader pin/leader block restoration and removal operations can be eliminated. Consequently, the threader arm motor/gear train system can be designed solely upon consideration of the torque, speed, power, momentum, etc., requirements of its other tape threading functions. Likewise the leader block removal and restoration operations can be designed for their own particular requirements. Moreover, the harsh consequences of any threader pin/receiver misalignments are greatly reduced by our device.

Our device for restoring and removing a leader block to and from a tape cassette can be used in conjunction with various kinds of threader arm mechanisms, such as, for example, the pantoarm device taught in the -936 patent. However, it is particularly well suited for cooperation with the threader arm and camming device taught in U.S. patent application Ser. No. 872,931, filed June 16, 1986 and the teachings of said patent application are hereby incorporated into this patent disclosure. However, regardless of the type of threader arm employed, our device is chiefly concerned with providing a smooth, accurate transition between two distinct operating positions. The first position can be thought of as being that point where the threader pin reaches its full forward position. It will be brought to this full forward position by a powered cam action. The power for this particular cam action is preferably supplied by a spring upwardly biased against the cam, especially a spring previously decompressed by the manual act of closing a tape cassette loading door and/or tray mechanism of the tape deck system. However, motors could also be employed to power this cam action even though their use is a less preferred source of power for the cam. In any event, when it is in the full forward position, the threader pin will be ready to commence its coupling operation with the receiver of the leader block. At this point the leader block will still be securely positioned in the cassette's leader block housing. Again, the threader pin is preferably delivered to this full forward position under the action of a spring powered movement of the cam in a manner hereinafter more fully described. After the threader pin and the leader block's receiver opening are completely coupled, the threader pin will be pulled to a second, or full rearward position by another movement of the cam. Again, this most preferably will be a manually powered movement carried out in conjunction with closing the tape cassette loading door.

The coupling operation itself can most conveniently be carried out by a rotating movement of the cassette and hence its associated leader block receiver opening. This coupling can be carried out while the threader pin is at rest in the full forward position; more preferably however, it can be carried out as the threader pin commences its rearward movement toward the full rearward position. In any case, as a consequence of the rearward pull upon the leader block by the threader pin, the raised lip boss of the leader block will be pulled past the edge of the cassette's cantilevered arm. Preferably this edge will have a rounded configuration. After the leader block has been pulled to the full rearward position provided by the powered cam action, the threader arm, under its own power, will then thread the leader block and its associated tape past a transducer head and on to a take-up reel.

Operated in reverse, our device will push the threader pin, and hence the leader block, from the full rearward position to the full forward position. Again, an upward biased spring forcing upon the under surface of the cam could power the movement of the threader pin to the full forward position. This forward motion will again seat the leader block in its housing in the tape cassette. In other words, this action will force the raised lip boss of the leader block inwardly past the edge of the cassette's cantilevered arm. Thereafter the leader block can be separated from the threader pin in various known ways. For example, the front end of the tape cassette can be rotated upwardly to free the enlarged member of the threader pin from its corresponding opening in the leader block. Again, rotation of the cassette can be accomplished by known types of manual or motor powered tape cassette loading trays and/or doors. Furthermore, in a manner analogous to the threader pin/leader block engagement operation, the disengagement operation also can be accomplished after the threader pin has reached its full forward position, or while the threader pin is returning to the full forward position. That is to say the disengagement can be accomplished as the cam follower moves toward the upper regions of the nonvertical cam slot and/or into the second vertical cam slot at the end of the nonvertical cam slot.

Essentially this device for restoring and removing a leader block to and from a tape cartridge is comprised of three main elements: a rotatable threader arm having a gear means, a rotatable yoke having a cam follower and a powered, and preferably a manually powered, cam device which cooperates with the cam follower. The rotatable threader arm will most preferably have a pivotally connected leader block carrier from which its threader pin is suspended. The threader arm could also be provided with various optional features. For example, it could have various flaggs which cooperate with sensors to verify certain select positions of the threader arm. In any case, the threader arm's threader pin preferably will comprise a rod portion and an enlarged member such as a ball or cylinder for engaging with a similarly shaped receiver opening or slot in a leader block, for example, a slot such as the one taught in the -936 patent. A threader pin whose enlarged member is an enlarged cylinder having a sloped, i.e., generally conical, top is even more preferred. Such a conical top on the enlarged member will facilitate coupling the leader block to the threader pin by a downward rotating motion of the front end of the tape cassette. As previously noted, threader pin engagement by rotation of the cassette is a highly preferred, but by no means mandatory, method of engaging these two parts. By way of an alternative, the leader block could just as well be engaged by a horizontal movement of the tape cassette in order to engage the rod portion of the threader pin, followed by a vertical motion of the tape cassette in order to engage the enlarged member of the threader pin with a compatible enlarged opening in the leader block receiver.

In general, leader block carriers such as the one employed in this device are, in effect, pivotally mounted extensions of a threader arm. They permit movement of the threader pin along paths which have configurations other than rigidly defined circular arcs. Our particular leader block carrier is however also provided with a gear means such as a series of teeth and spaces or a single tooth and space system. This gear means is intended to cooperate with another gear means which forms a part of a yoke. In a preferred embodiment of this invention, the other gear means has a yoke-like member which forms two teeth which cooperate with a single tooth and space system attached to the carrier arm. The yoke is pivotally connected to a base such as an upright shaft which supports the yoke near the center of its stem portion. The shaft in turn is anchored to the base of the tape deck system. The stem portion of the yoke terminates in a cam follower. Ideally this cam follower is completely round; and in one particularly preferred embodiment, the round cam follower will also have a roller, or be otherwise rotatably mounted to the stem portion of the yoke. This will reduce friction and otherwise facilitate cam follower/cam cooperation. In all cases, however, the cam follower will cooperate with a powered cam device, such previously noted, a manually powered cam device, such as one powered by a downward push upon a cassette loading tray or door mechanism, is particularly well suited for use in conjunction with this device. The cam device's camming surface could be a cam slot, a raised boss region or a camming edge. In one highly preferred embodiment of this invention the cam follower will project into a cam slot in a vertical surface of the cam device.

The preferred cam device with which the cam follower could associate will most preferably have a horizontal surface and a vertical surface. They can be joined at right angles at one of their respective ends. The horizontal surface of the cam device will preferably be the part of the cam attached to a power means for raising and lowering the cam. This horizontal surface could, for example, receive downwardly directed manual forces initiated by closing the tape cassette loading door upon an appropriate linkage system. It could also receive upwardly directed spring forces from a spring, especially one initially compressed by the downwardly directed manual forces used to close the tape loading door. The power means could, of course, also be directly connected to the cam's vertical surface; but this is a less preferred embodiment. In either case however, the vertical surface will preferably have a generally crescent-shaped cam surface. Again, the camming surface could be a raised or bossed surface, a camming edge, or a camming slot. The camming slot format is however, for reasons of mechanical reliability, highly preferred. In effect a slotted cam configuration serves to confine the cam follower to the camming surface. Such a camming slot will consist of a vertical cam slot region which leads into a nonvertical cam slot region. Ideally, the nonvertical cam slot region will approach the vertical cam slot region at an angle of between 20 and 50 degrees from the vertical. More preferably, however, the approach will be about at 45 degrees. In another highly preferred embodiment of this invention the nonvertical cam slot region also will be provided with a second vertical slot at its upper extreme end. This arrangement will further serve to locate the cam follower at this extreme end of the nonvertical region.

When the cam follower is driven to an extreme end of the camming surface by a powered movement of the cam device, the yoke will rotate in one direction. Consequently, the yoke's gear means will engage and move the gear means of the leader block carrier. In turn, the leader block carrier will move in the direction of the yoke's rotation and thereby cause the threader pin to move to one of its predetermined, extreme positions. Conversely, when the cam follower is driven to the other extreme end of the camming surface, the yoke will engage and rotate in the opposite direction and thereby move the threader pin to the other extreme position. In the most preferred embodiment of this invention, a spring powered movement of the cam in an upward direction will drive the cam follower to the lowest part of a vertical cam slot region. This movement, in turn, will cause the threader pin to be pushed to the full forward position. Conversely, a powered movement (preferably a manually powered movement) of the cam in a downward direction will drive the cam follower into the highest part of the nonvertical cam slot. This movement, in turn, will cause the threader pin to be pulled to its full rearward position. Again, in one highly preferred embodiment of this invention, the highest part of the nonvertical cam slot region also will lead into a second vertical cam slot region in which the cam follower can be seated. Preferably, the cam follower's attainment of the second vertical cam slot will drive the threader pin to the fullest rearward position it is capable of attaining under the action of the camming device. Thereafter the threading movement of the leader block to the take-up reel can be carried out under the power of the threader arm's gear motor system. However, as was previously noted, the threader arm's gear motor torque is not needed to restore or remove the threader pin to and from the cassette's leader block housing since these operations can be completely carried out by the powered cam system.

The threader pin could be completely seated in the leader block receiver by the forward movement of the threader pin in attaining the full forward position. However, in some highly preferred embodiments of this invention, complete engagement of the threader pin to the leader block receiver will not be provided by the threader pin's forward movement. Optional, but highly preferred additional engaging operations will be employed. They can be accomplished in known ways. For example, the front of the tape cassette could address the vertical threader pin at an upward sloping angle. That is, the forward end of the tape cassette and its associated leader block will be initially higher than the rear end of the cassette. The cassette will then be rotated downward so that the leader block's receiver will encompass or otherwise engage with the threader pin in a substantially vertical relationship. A conical top on a cylindrical base of the threader pin will greatly facilitate such a rotating engagement of the threader pin and leader block. The threader pin could be pulled to its full rearward position after the threader pin/leader block receiver engagement is complete; or the engagement could take place during the initial stages of the rearward movement of the threader pin. In this case, the threader pin/leader block receiver engagement will most preferably be completed before the cam follower enters into the upper regions of the nonvertical cam slot regions.

DESCRIPTION OF THE PREFERRED EMBODIMENTS

This device for restoring and removing a leader block to and from its housing within a tape cassette could be used with a wide variety of threader arm and take-up real mechanisms. For example, it might be used in conjunction with the threader arm disclosed in the -936 patent. Our device is, however, particularly well suited for use in conjunction with the threader pin camming mechanism disclosed in U.S. patent application Ser. No. 872,931. The camming mechanism disclosed therein is intended to lead a threader pin to a first predetermined position which could correspond to a position wherein the tooth of the leader block carrier falls into the open space of the yoke. As a matter of convenience in relating these two patent applications, the numbering system employed in U.S. patent application Ser. No. 872,931 will be used in this patent application in order to designate certain elements which are common to both patent applications.

Figure 1:
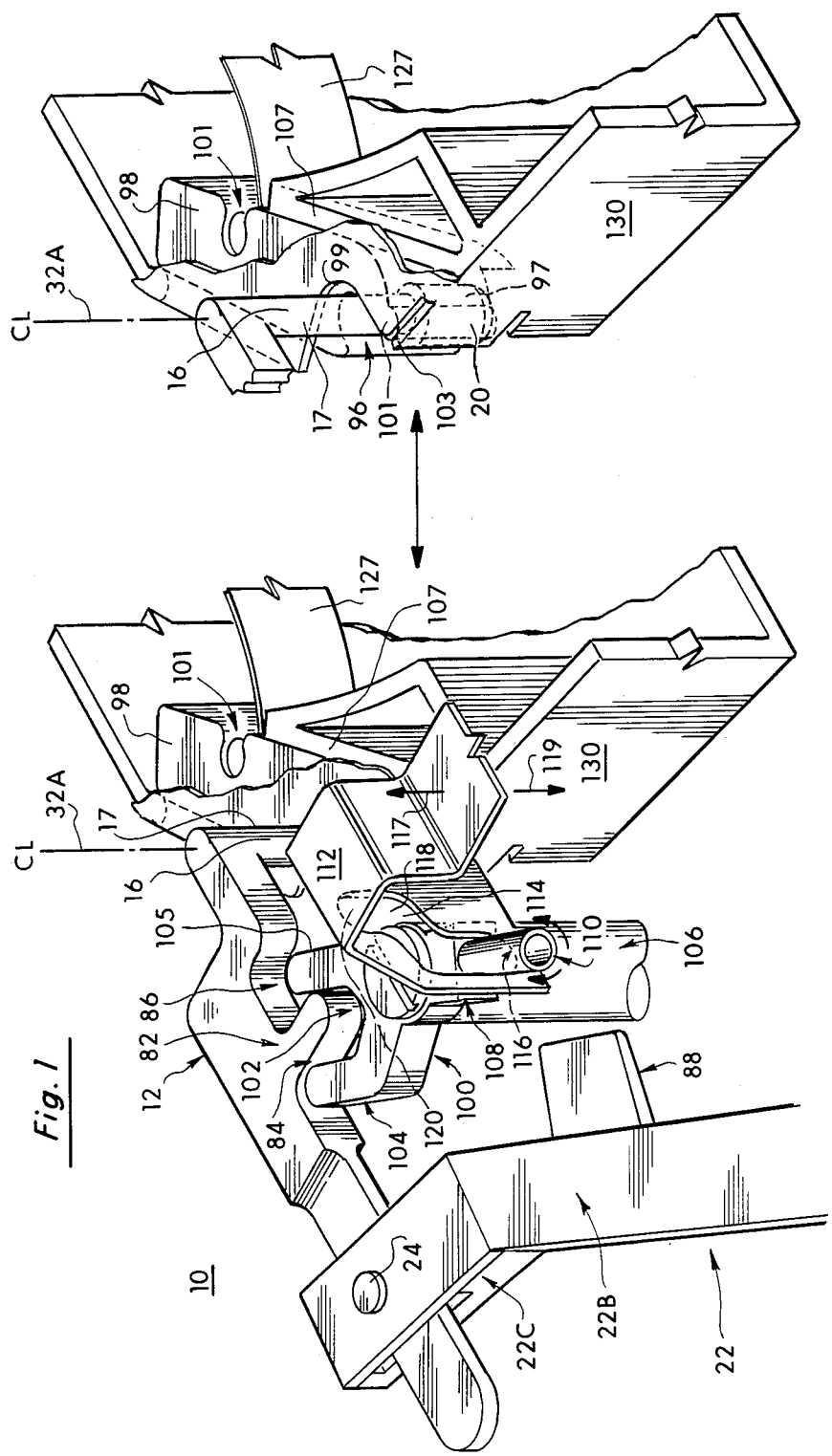
FIG. 1 is a partially exploded, perspective view of our device for restoring and removing a leader block to and from a tape cassette. It depicts the point in the operation of the device where the threader pin is about to pull the leader block free of the cassette.

FIG. 1 shows the three major elements of our device 10 nominally associated in one of their working relationships. Here the leader block carrier 12 is mounted to a threader arm 22 by means of a pivot 24. The leader block carrier 12 is shown cooperating with the yoke 100 in such a manner that the threader pin 16 is in its full forward position 32A. The leader block receiver 96 is shown in complete engagement with the threader pin 16. The engagement most preferably will have been accomplished by movement of the cassette 130 with respect to the threader pin 16 as, for example, by the cassette movements depicted in FIG. 4. The means by which this movement of the cassette with respect to the threader pin 16 is accomplished can be by known cassette loading systems, particularly those that rotate the cassette into engagement with the threader pin 16. In any case, leader block carrier 12 is shown provided with a gear means 82 generally having at least one tooth 84 and at least one space 86. The forward region of leader block carrier 12 supports a threader pin 16 having a rod member 17 and an enlarged member, or base, 20. The center line CL of threader pin 16 is generally indicated along center line 32A. This center line 32A can also serve to indicate the full forward position of threader pin 16. When threader pin 16 is seated in receiver 96, rod 17 will be seated in rod receiver region 99 and the threader pin's enlarged member 20 will be seated in receiver region 97 of leader block 96. Leader block 98 is shown housed in a tape cassette 130. FIG. 1 could be taken to indicate that the leader block 98 is about to be removed from cassette housing 107 by a rearward pull of threader pin 16. FIG. 1 also could depict the device 10 when the leader block 98 has just been restored to the cassette 130 by a forward push upon threader pin 16. As is better illustrated in FIG. 2, a distance d is traveled by threader pin 16 in moving from the full forward position, generally indicated by 32A, to a full rearward position, generally indicated by 32B in FIG. 2. As also will be further illustrated in FIG. 2, threader pin 16 will be moved to position 32A when yoke 100 is rotated about shaft 106 under the action of cam 112. Rotation of yoke 100 about shaft 106 in the opposite direction will bring threader pin 16 to the full rearward position 32B. Stem region 108 of yoke 100 is rotatably mounted upon shaft 106. Stem region 108 terminates in cam follower 110. Preferably cam follower 110 will be a roller or be otherwise rotatably mounted to stem region 108.

FIG. 1 shows yoke 100 provided with two teeth 104 and 105 separated by a space 102. In operation tooth 84 of leader block carrier 12 would normally fit into space 102 of yoke 100. Cam follower 110 is shown provided with a rounded surface which extends through a somewhat cresent-shaped slot 114 in cam 112. Again, cam follower 110 preferably will be further provided with a roller means, not shown, which permits free rotation of cam follower 110 about the stem region of the yoke as indicated by the rotation arrows about the end of cam follower 110. Such rotation serves to reduce friction and generally facilitates motion of the cam follower 110 in cam slot 114. Cam 112 is shown with a horizontal surface and a vertical surface which contains the cam slot 114. Generally speaking cam slot 114 has a vertical cam slot region 116 which leads into a nonvertical cam slot region 118. Preferably, the nonvertical cam slot region 118 will also have a second vertical region 120 at its upper extreme end.

Cam 112 is movable in both a generally upward vertical direction, as indicated by arrow 117 and in a generally downward direction, as indicated by arrow 119. The power means by which cam 112 can be raised and lowered are varied but well known to the art and are not shown in FIG. 1. Manual, spring or motor powered devices can be used to raise and lower cam 112. For example, a closing of the tape cassette loading door could, through known linkages not shown, force the cam down as indicated by arrow 119. A spring, not shown, placed under the horizontal cam surface could force the cam upward in the direction suggested by arrow 17. These cam powering means could be activated in various known ways including through the use of cassette loading door closings, through the use of light sensors activated by flaggs such as the one indicated by 88 on the threader arm, and like methods known to this art. For example, such a flagg and sensor system could be used to verify that the threader arm 22 is in a position such that the leader block carrier's gear 82 is ready to cooperate with the yoke's gear tooth 104 and thereby deliver the threader pin 16 to its full forward position 32A.

FIG. 1 also illustrates the preferred embodiment of this invention, wherein the nonvertical cam slot region 118 is further provided with a second vertical cam slot region 120. Cam follower 110 will be driven into region 120 when cam 112 is forced to the extremes of the generally downward direction indicated by arrow 119. Such movement of the cam follower 110 into region 120 will cause yoke 100 to fully rotate in the rearward direction. This will pull the threader pin to its full rearward position. Conversely, an upward movement of cam 112 in the general direction of arrow 117 will force cam follow 110 back into the lowest regions of the vertical cam slot 116. Such movement causes yoke 100 to rotate in the forward direction. Again, rotation of yoke 100 in the forward direction will cause tooth 104 of yoke 100 to push tooth 84 of leader block carrier 12 forward in the forward direction. Yoke teeth 105 and 104 and the tooth 84 and slot 86 system of leader block carrier 12 are so adapted and arranged that the force of tooth 104 upon the rear side of leader block carrier tooth 84 will drive threader pin 16 from its full rearward position to its full forward position. Conversely, rotation of yoke 100 in the rearward direction will cause the inside of tooth 105 of yoke 100 to force itself against the forward side of tooth 84 of leader block carrier 12. This motion will again move threader pin 16 from its full forward position back to its full rearward position. Assuming a successful coupling of leader block 98 and threader pin 16, the device will then be capable of pulling leader block 98 and hence tape 127 from a cassette tape reel not shown in FIG. 1. The tape 127 is shown attached to leader block 98 by known methods such as a pin and groove system 101. In any case, a rearward pulling on threader pin 16 will cause boss 101 of leader block 98 to be pulled past cantilevered arm 103 of tape cassette 130. Once threader pin 16 reaches its full rearward position it will then be ready to be pulled through the remainder of the tape deck system to a take-up reel not shown in FIG. 1. A powered, threader arm 22, such as the one disclosed in U.S. patent application Ser. No. 872,931, can then be used to thread the leader block 98 and tape 127 past a transducer head and on to a take-up reel system.

Figure 2:
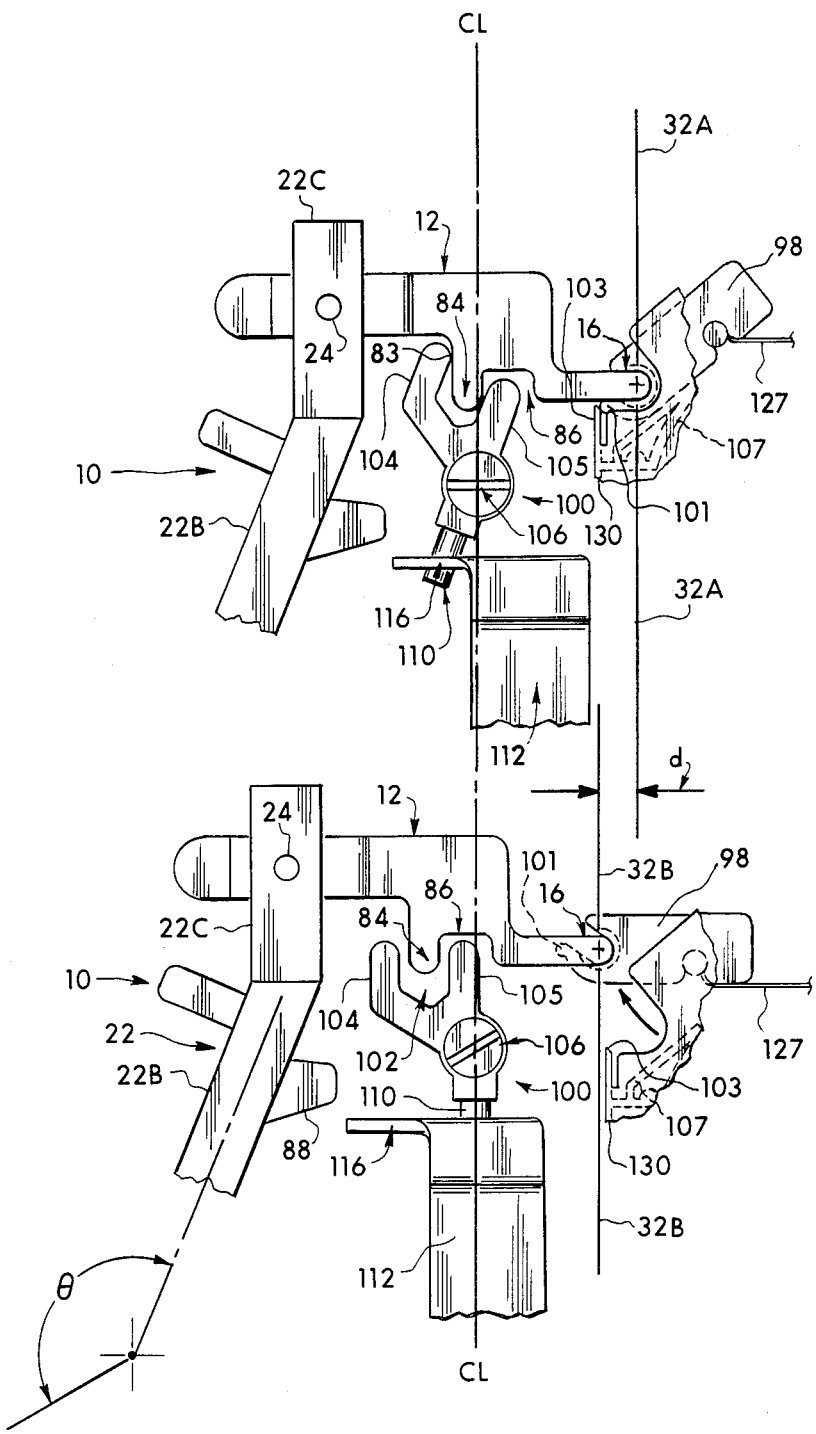
FIG. 2 is a plan view depicting the device in its full forward and its full rearward positions.

FIG. 2 shows our device 10 in plan views of its two primary operating positions. The top view depicts the device 10 in its full forward position; the bottom view depicts the device 10 in its full rearward position. In the top view, the plan view center line of threader pin 16 is indicated by line 32A. This corresponds to center line 32A of FIG. 1. Similarly, plan view center line 32B corresponds to the center line of the threader pin in its full rearward position. Plan view center line 32A is separated from plan view center line 32B by a distance d. A center line CL is shown passing through the center of shaft 106 which supports yoke 100. Shaft 106 is fixed, i.e., shaft 106 remains stationary with respect to the common center line CL shown with respect to both the top and the bottom views of FIG. 2.

In the bottom view, yoke tooth 105 has forced leader block carrier 12 to the rear by forcing leader block carrier tooth 84 rearward. In this full rearward position, cam follower 110 will be in the extreme upper regions of nonvertical cam slot 118 as discussed in conjunction with FIG. 1. In a preferred embodiment of this invention, a roller equipped cam follower 110 will be in the second vertical region 120, when threader 16 is in its farthest rearward position. The force to accomplish this is delivered by a power means, not shown, attached to the cam 112. A manually powered action, particularly one initiated by closing the tape loading door and thereby forcing cam 112 downward by means of mechanical linkages between the door and the cam is preferred. Preferably leader block carrier 12 is pivotably attached to threader arm 22 at pivot point 24. The threader arm could be of many well known varieties including those provided with light or electrical sensor flaggs such as those indicated in FIG. 2 by numbers 88 and 89. However, as previously noted, our device 10, is particularly well suited for use in conjunction with the threader arm and cam mechanism described in U.S. patent application Ser. No. 872,931. It too is provided with sensor flaggs.

The top view of FIG. 2 shows our device 10 in its full forward position. The center line of threader pin 16 is at its farthest forward position 32A. It is brought to this position by the force of tooth 104 of yoke 100 upon the rear surface 83 of tooth 84 of leader block carrier 12. Again as noted with respect to FIG. 1, this full forward position is achieved by placing an upward force upon cam 112. This upward force drives cam follower 110 into the lower regions of the vertical cam slot 116. This in turn causes yoke 100 to rotate about its pivot on shaft 106 so that tooth 104 of the yoke forces the leader block carrier 12 forward a distance d. As previously noted, threader pin 16 will then engage leader block 98. After the leader block 98 and the threader pin 16 are engaged, for example by rotation of the cassette upon threader pin, the threader pin 16 can again be pulled back to its full rearward position. This action will pull leader block boss 101 past cantilever arm 103 and thereby remove the leader block 98 from the cassette housing 107. During its movement to the rearward position, threader pin 16 will pull leader block 98 completely from the cassette housing 107. This, in turn, will pull tape 127 from the cassette 130. Thereafter threader arm 22, under its own motive power, will complete the tape threading operation through the remainder of the tape deck system. Conversely, leader block 98 will be restored to its cassette housing 107 by forcing leader block boss 101 inwardly past cantilever arm 103 and thereby restoring leader block 98 to a snug fit in housing 107.

Figure 3:
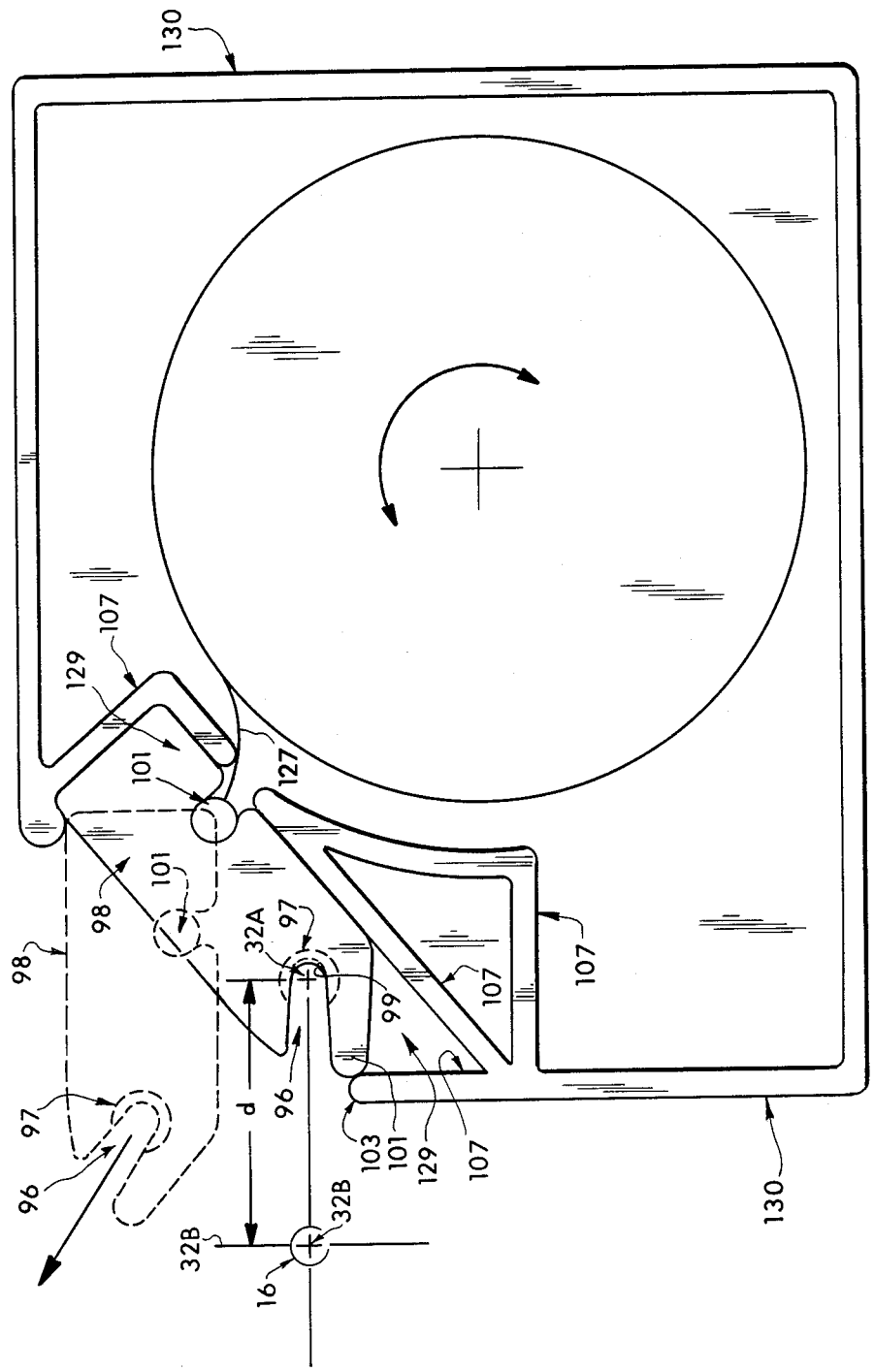
FIG. 3 is a cross-sectional view of a prior art tape cassette mechanism. It emphasizes the relationship of the incoming threader pin to the leader block receiver's diagonal orientation with respect to the tape cassette.

FIG. 3 shows a plan view of a prior art tape cassette system such as the one taught in U.S. Pat. No. 4,383,660. It is shown to further illustrate a preferred position for a housing 107 for a leader block 98 in a tape cassette 130. As taught in U.S. Pat. No. 4,383,660, and as illustrated in FIG. 3, leader block 98 is preferably positioned in a diagonal housing 107 in one of the forward corners of an otherwise rectangular tape cassette 130. The housing 107 defines an open space 129 in which the leader block 98 resides. The forward position center line 32A of threader pin 16 is shown located in the center of receiver 96. As previously noted with respect to both FIG. 1 and FIG. 2, threader pin 16 moves a distance d in moving from point 32A to point 32B or from 32B back to 32A. In any event, upon engagement of the rod 17 and enlarged member 20 of threader pin 16 within leader block receiver regions 99 and 97 respectively, and upon a pulling upon the leader block 98 by threader pin 16, boss 101 of leader block 98 will be pulled past the edge of cantilevered arm 103. Continued pulling will carry the leader block 98 to the position indicated by the dotted line image of leader block 98. This action will commence pulling tape 127 from the cassette 130. Once delivered to rearward position 32B, the leader block is available for delivery to the take-up reel, under the action of an independently powered threader arm.

Figure 4:
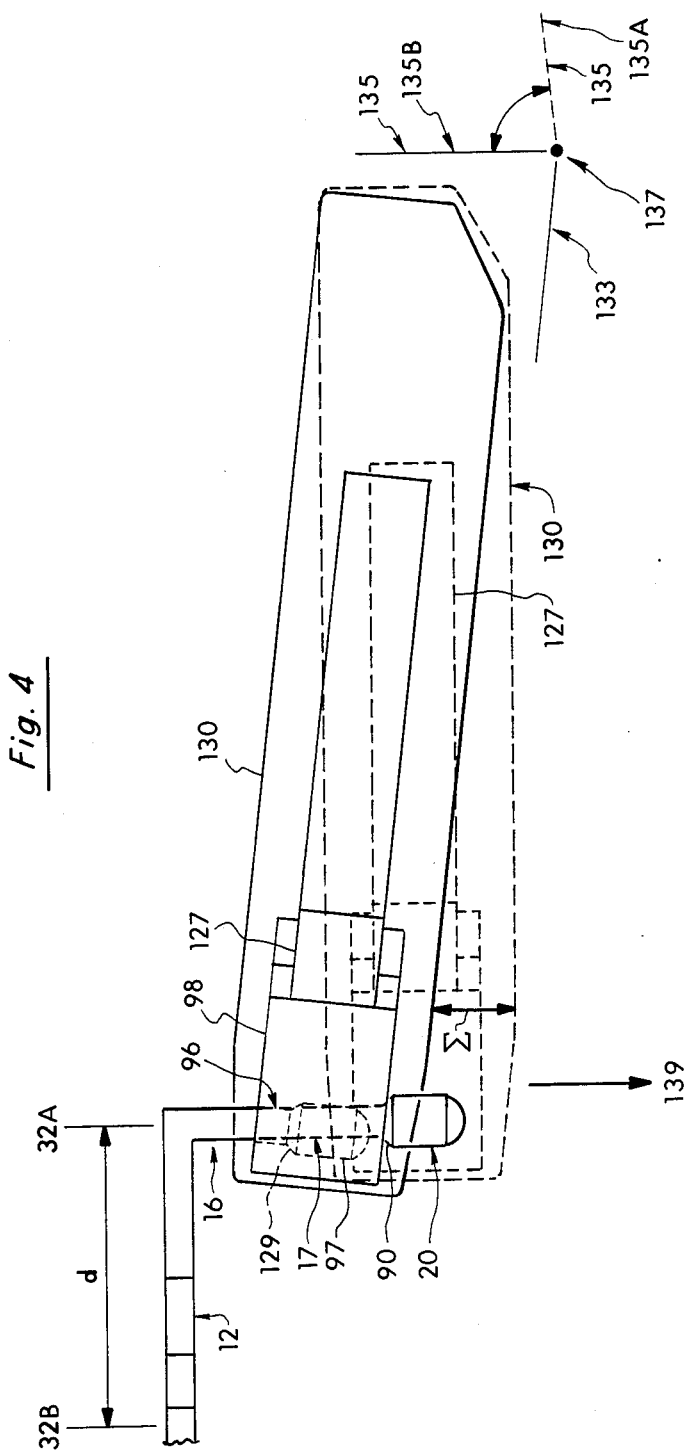
FIG. 4 shows a preferred method for engaging the threader pin to the leader block receiver after the threader pin attains its full forward position.

FIG. 4 shows a preferred orientation of tape cassette 130, and hence the leader block 98 located within tape cassette 130 as threader pin 16 first engages with receiver slot 96. In this preferred orientation, the tape cassette 130 is not in a horizontal position but rather is in an upwardly inclined position as indicated by the solid line outline of the tape cassette 130. FIG. 4 generally indicates that cassette 130 can rest in a tray 133 made accessible by a cassette loading door 135 having a hinge means 137. Arrow 139 serves to indicate that a downward rotation of the cassette, by known means not shown, could create a downward force which could be used to force cam 112 not shown in the downward direction indicated by arrow 119 in FIG. 1. These two cassette orientations are shown at an angle sigma which most preferably will be from about 20 degrees to 45 degrees from the horizontal. In any event, when tape cassette 130 is at an angle sigma, the upper regions of receiver slot 99 could contact the upper regions of rod 17, as generally indicated in FIG. 4, before the threader pin's enlarged member 20 contacts receiver region 97. Thereafter, cassette 130 could be rotated through angle sigma by various, but well known powered rotation means not shown in FIG. 4. Again, however, rotation by a manually powered movement associated with a closing of the tape cassette loading door from a position 135A to a position 135B with respect to the tape deck system not otherwise shown is preferred. Regardless of the source or method of its motive power however, the rotation of the cassette 130 could take place before the threader pin 16 begins its rearward movement toward point 32B. This rotation could also take place while the threader is in the initial stages of this rearward movement. In either case, however, the cassette's rotation should preferably be such that a neck region 129 of receiver slot 96, located between the enlarged member receiver region 97 and the rod receiver region 99, should remain above the top of the conical portion 90 of threader pin 16, until the enlarged member 20 starts to enter base receiver region 97. Thereafter continued rotation will cause threader pin 16 to be completely seated in receiver 96 of leader block 98. The uncoupling operation will involve, essentially, a reversal of the above coupling steps. The cassette will be rotated upward and the threader pin 16 removed by a rearward motion. Another obvious way to couple these elements is to move the cassette horizontally until the rod 17 is engaged, and then lower the cassette vertically to engage the base 20 of the threader pin to the base receiver region 97 of the leader block. Reversal of these steps will uncouple the threader pin and leader block. Here again, manual movements of the tape cassette loading door can accomplish these actions through use of mechanical linkage system known to this art.

Those skilled in this art will also appreciate that the apparatus configurations shown in FIGS. 1 through 4 should not be taken as limitations upon the broader teachings of this invention. For example, threader pins having different configurations could be employed. Likewise, various gear means other than those illustrated in the drawings are also within the broader teachings of this patent disclosure. Finally, it should also be noted that while this patent disclosure generally speaks in the context of magnetic tape drive systems, the device disclosed herein could just as well be used in tape drive systems other than those associated with magnetic tape drives, e.g., with optical storage and surface deformation tape systems.

Thus having disclosed our invention, we claim:

1. A device for restoring and removing a leader block to and from a leader block housing in a tape cassette, said device comprising:
    a threader arm;
    a leader block carrier pivotally mounted to the threader arm and which further comprises a first gear means;
    a threader pin attached to the underside of the leader block carrier;
    a yoke having (1) a second gear means for engaging the first gear means of the leader block carrier (2) a stem pivotally mounted upon a base and (3) a cam follower which extends from the stem; and
    a cam device having (4) a camming surface for engaging the cam follower and (5) means for receiving forces capable of operating said cam device.

2. A device for restoring and removing a leader block to and from a leader block housing in a tape cassette, said device comprising:
    a threader arm;
    a leader block carrier pivotally mounted to the threader arm and which further comprises a first tooth and detent means;
    a threader pin comprised of a rod and an enlarged member with said threader pin being attached to the underside of the leader block carrier;
    a yoke having (1) a second tooth and detent means for engaging the first tooth and detent means of the leader block carrier (2) a stem pivotally mounted upon a base and (3) a cam follower which extends from the stem; and
    a cam device having (4) a slotted camming surface, comprised of a verticle cam slot connected to a nonvertical cam slot, for engaging the cam follower which extends from the yoke and (5) means for receiving forces capable of raising and lowering said cam device.

3. A device for restoring and removing a leader block to and from a leader block housing in a tape cassette, said device comprising:
    a powered threader arm;
    a leader block carrier pivotally mounted to the threader arm and which further comprises a single tooth and detent means;
    a threader pin attached to the underside of the leader block carrier and wherein said threader pin is comprised of a rod and an enlarged cylinder having a conical top;
    a yoke having (1) two teeth and a detent for engaging the single tooth and detent of the leader block carrier (2) a stem pivotally mounted upon a base and (3) a cam follower having a round, rotatable member which extends from the stem; and
    a cam device having (4) a slotted camming surface comprised of a vertical cam slot connected to a nonvertical cam slot adapted for receiving the round, rotatable cam which extends from the yoke and (5) a horizontal surface for receiving forces capable of raising and lowering said cam device in conjunction with a manual opening of a tape cassette loading door such that when the door is closed the cam follower is pushed to an upper region of the nonvertical cam slot and the threader pin is pushed to a full rearward position and such that, when the cam follower is pushed to a lower region of the vertical cam slot, the threader pin is pulled to a full forward position.

4. A device for restoring and removing a leader block to and from a leader block housing in a tape cassette, said device comprising:

a powered, horizontally driven threader arm;

a leader block carrier which is pivotally mounted to the threader arm and which further comprises a single tooth and two detents;

a threader pin attached to the underside of the leader block carrier and wherein said threader pin is comprised of a rod and an enlarged cylinder having a conical top;

a yoke having (1) two teeth and a detent for engaging the single tooth and two detents of the leader block carrier (2) a stem pivotally mounted upon a base and (3) a cam follower having a cylindrical, rotatable roller which extends from the stem; and a cam device having (1) a slotted, continuous camming surface comprised of (a) an upper vertical cam slot leading to (b) a nonvertical cam slot at an angle between about 20 and about 45 degrees which in turn leads to (c) a lower vertical cam slot, with said camming surface being adapted for receiving a round rotatable roller of the cam follower which extends from the yoke (2) a horizontal surface for receiving forces capable of raising and lowering said cam device in conjunction with a manual opening of a tape cassette loading door having a linkage system so adapted and arranged that a manual closing of the door forces the cam downward and thereby (d) compressing a spring, (e) pushing the rotatable roller of the cam follower into the upper vertical cam slot which, in turn, (f) pulls the threader pin to a full rearward position in order to pull the leader block out of the tape cassette, and so further adapted and arranged that the leader block is brought to a full forward position by an upward bias of the spring which serves to (g) force the cam follower into the lower vertical cam slot (h) rotate the yoke and thereby (i) push the threader pin to a full forward position in order to engage the leader block.

* * * * *